US008489941B2

(12) United States Patent
Anand et al.

(10) Patent No.: US 8,489,941 B2
(45) Date of Patent: Jul. 16, 2013

(54) AUTOMATIC DOCUMENTATION OF TICKET EXECUTION

(75) Inventors: Vishal Anand, Bihar (IN); Manish Gupta, New Delhi (IN); Ravi Kothari, New Delhi (IN); Venkateswara R. Madduri, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 12/553,335

(22) Filed: Sep. 3, 2009

(65) Prior Publication Data

US 2011/0054964 A1 Mar. 3, 2011

(51) Int. Cl.
*G06F 11/00* (2006.01)

(52) U.S. Cl.
USPC .................................. 714/57; 714/48; 714/25

(58) Field of Classification Search
USPC .......................................... 714/57, 25, 46, 45
See application file for complete search history.

(56) References Cited

U.S. PATENT DOCUMENTS

| 7,065,767 | B2  |   | 6/2006  | Kambhammettu et al.     |         |
|-----------|-----|---|---------|--------------------------|---------|
| 2004/0120250 | A1 | * | 6/2004  | Langevin et al.          | 370/216 |
| 2005/0033777 | A1 |   | 2/2005  | Moraes et al.            |         |
| 2005/0120101 | A1 |   | 6/2005  | Nocera                   |         |
| 2007/0028303 | A1 |   | 2/2007  | Brennan                  |         |
| 2007/0043674 | A1 |   | 2/2007  | DiFalco et al.           |         |
| 2007/0136242 | A1 |   | 6/2007  | Auvenshine et al.        |         |
| 2008/0275921 | A1 |   | 11/2008 | Gunabalasubramaniam et al. |       |
| 2008/0313491 | A1 | * | 12/2008 | Adams et al.             | 714/4   |
| 2009/0055684 | A1 | * | 2/2009  | Jamjoom et al.           | 714/26  |
| 2009/0168664 | A1 | * | 7/2009  | Washburn                 | 370/254 |

FOREIGN PATENT DOCUMENTS

WO    WO 00/42513    7/2000

OTHER PUBLICATIONS

Su et al., AutoBash: Improving configuration management with operating system causality analysis, SOSP'07, Oct. 14-17, 2007, Stevenson, Washington , USA, pp. 1-14.
Oberheide et al., If It Ain't Broke, Don't Fix It: Challenges and New Directions for Inferring the Impact of Software Patches, University of Michigan, Ann Arbor, MI, http://www.webcitation.org/mainframe, Jun. 2009, pp. 1-8.
Aggarwal et al., NetPrints: Diagnosing Home Network Misconfiguration Using Shared Knowledge, Technical Report, MSR-TR-2008-102, Jul. 2008, pp. 1-16.
Nimsoft Service Delivery Portal—On-Demand Slm Reporting, http://wv.m.nimsoft.com/solutions/service-delivery-portal/index.php, pp. 1-3.
Configuration Control—Tripwire, http://www.tripwire.com, Sep. 2009.

* cited by examiner

*Primary Examiner* — Sarai Butler
(74) *Attorney, Agent, or Firm* — Ryan, Mason & Lewis, LLP

(57) ABSTRACT

Techniques for automatically documenting activity data in connection with execution of a ticket are provided. The techniques include receiving activity data in connection with execution of a ticket, processing the activity data to generate an output, and appending the processed activity data output to the ticket for ticket enrichment. Techniques for identifying a wrong choice of resolution code in connection with a ticket are also provided. The techniques include analyzing one or more previous tickets to determine a category in which a ticket belongs, determining whether a user-defined code is in variance with a system-suggested code, and sending an alert to a system administrator if the user-defined code is different than the system-suggested code.

20 Claims, 3 Drawing Sheets

AUTOMATIC DOCUMENTATION OF TICKET EXECUTION

FIELD OF THE INVENTION

Embodiments of the invention generally relate to information technology (IT), and, more particularly, to executed action documentation.

BACKGROUND OF THE INVENTION

Change tickets and/or problem tickets, when executed by system administrators, can cause changes to the file system in unknown ways. Further, a majority of problems that occur in IT systems are a result of such changes introduced at the system, middleware, or application level.

Additionally, in existing approaches, documentation of ticket execution is a manual process. As a result, it may not be done in a systematic manner, as well as, some important information may be missed from being documented.

SUMMARY OF THE INVENTION

Principles and embodiments of the invention provide techniques for automatic documentation of ticket execution. An exemplary method (which may be computer-implemented) for automatically documenting activity data in connection with execution of a ticket, according to one aspect of the invention, can include steps of receiving activity data in connection with execution of a ticket, processing the activity data to generate an output, and appending the processed activity data output to the ticket for ticket enrichment.

Also, another exemplary method (which may be computer-implemented) for identifying a wrong choice of resolution code in connection with a ticket, according to one aspect of the invention, can include the steps of analyzing one or more previous tickets to determine a category in which a ticket belongs, determining whether a user-defined code is in variance with a system-suggested code, and sending an alert to a system administrator if the user-defined code is different than the system-suggested code.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media). These and other objects, features and advantages of the present invention will become apparent from the following detailed description of illustrative embodiments thereof, which is to be read in connection with the accompanying drawings.

DETAILED DESCRIPTION

Principles of the invention include automatic and accurate recording and/or documentation of actions (for example, changes, system behavior, configuration, etc.) executed/implemented on managed end-points before, during, and after the execution/implementation of change and/or problem tickets. The techniques described herein can, for example, span across multiple systems. One or more embodiments of the invention include obtaining change, configuration, and system behavior data through an agent residing at a managed end-point, and pulling configuration data from a configuration server. Also, the techniques herein can include processing the obtained change, configuration, and system behavior data to create a report and an alert for ticket enrichment, as well as appending the change information to the ticket for future use.

As detailed herein, and unlike the disadvantages of the existing approaches, one or more embodiments of the invention include pulling configuration data explicitly from a configuration server that is used for storing configuration data for all the clients in order to combine it with obtained change data. Additionally, an alert and/or warning can be provided to a user before making any changes based on past ticket information stored in a database. Further, users can be categorized based on the commands they implemented.

One or more embodiments of the invention include the use of modules and/or components to carry out the steps detailed herein. By way of example, agent components, which may reside on a managed end-point, can be used to obtain changes, configuration, and system behavior data. Server components can be used to obtain configuration data from a configuration store, as well as to append the change and other information to a ticket for future use. One or more embodiments of the invention can also include summarizing and/or filtering the uploaded data.

The techniques described herein also include generating proactive alerts and reports via, for example, comparing configuration and/or behavior snapshots at two different points in time and taking automated actions. Automated actions can include, for example, generating alerts and warnings to system administrators if abnormal activity is detected. Further, one or more embodiments of the invention can include suggesting solution(s) steps by comparing the problem/change ticket with successfully solved similar to problem/change tickets.

One or more embodiments of the invention can also include automatically identifying one or more resolution codes apt for the given problem/change ticket by examining and/or analyzing the recorded actions and/or commands used while solving the problem/change ticket. Also, the techniques described herein can additionally include analyzing those actions to map to the one or more resolution codes.

Wrong resolution code can lead to flawed analysis, trending, etc. By way of illustration, an exemplary scenario using an existing approach can include the following. A ticket comes to a dispatcher and comes with a code (open code). The ticket describes what the problem is, and is handled by a system administrator (admin). After resolution, the system admin updates the ticket with the resolution code; however, this resolution code is frequently wrongly put (thereby making subsequent analysis useless). In contrast, because one or more embodiments of the invention capture accurate information about the commands implemented at the service node, the techniques detailed herein can be used to automatically set the resolution code.

Figure 1:
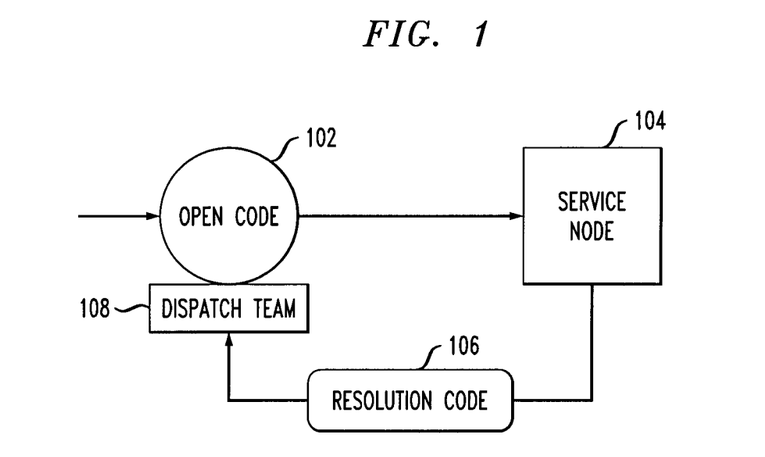
FIG. 1 is a diagram illustrating capturing of resolution code, according to an embodiment of the present invention.

FIG. 1 is a diagram illustrating capturing of resolution code, according to an embodiment of the present invention. By way of illustration, FIG. 1 depicts open code 102, a service node 104, resolution code 106 and a dispatch team 108. As additionally described in connection with FIG. 4, one or more embodiments of the invention also include automatic assignment of resolution code and detection of a wrong choice of resolution code in connection with a ticket.

By way of illustration, for example, consider a situation where a ticket comes to a dispatcher. The ticket comes with a code (for example, open code), and the ticket describes what the problem is. The ticket can be handled by a system administrator (admin), and after resolution, the system admin updates the ticket with the resolution code. This resolution code, though, is often wrongly inserted, rendering any subsequent analysis useless. However, because the techniques detailed herein capture accurate information about the commands implemented at the service node, one or more embodiments of the invention can be used to automatically set the (correct) resolution code.

One or more embodiments of the invention, as noted herein, include alerting and/or suggesting the resolution code. The techniques detailed herein makes it possible to append to a ticket the information on what commands were implemented and which files were touched. The appended information may include other contextual information as well.

By way of example, whenever a user selects a ticket resolution code, analysis engine component of one or more embodiments of the invention looks at the previous tickets in the resolution code category. Based on the information appended to the current ticket and the information appended to the previous tickets, it can be determined how similar the information is. One or more embodiments of the invention also include using clustering approaches, wherein if the "information distance" is greater than a given threshold, the system admin can be warned that the choice of the ticket code is potentially wrong. The same technique can also be used to suggest the closest code to set.

As described herein, one or more embodiments of the invention include a collection of utilities for obtaining visibility into what low-level changes have occurred in a system due to the high-level changes introduced as a result of ticket execution by a system admin. By way of example, consider the following use case scenarios.

One use case can include a scenario where a system admin introduces a patch to the operating system or middleware or application by running one or more commands on the system. The system admin can uses the utility described herein simultaneously with the execution of the high level change commands. The utility traces the commands and creates a report on all the files created, accessed, modified (and were pre-existent), deleted, etc. In one or more embodiments of the invention, this report can be shown to the user in a console as the user introduces the changes on the target system in a real-time manner or could be generated at any later time once the change is done.

In another use case scenario, a system admin opens shell connections with a system and perform changes. One or more embodiments of the invention can monitor and create a report of which commands were implemented and which files were created or modified in the right order.

Yet another use case scenario can include, for example, on introduction of changes to os, middleware, and application components, new file-system changes and behavior being introduced when these components run. One or more embodiments of the invention can be deployed to monitor the components and create reports on the file-system change behavior of these components.

Figure 2:
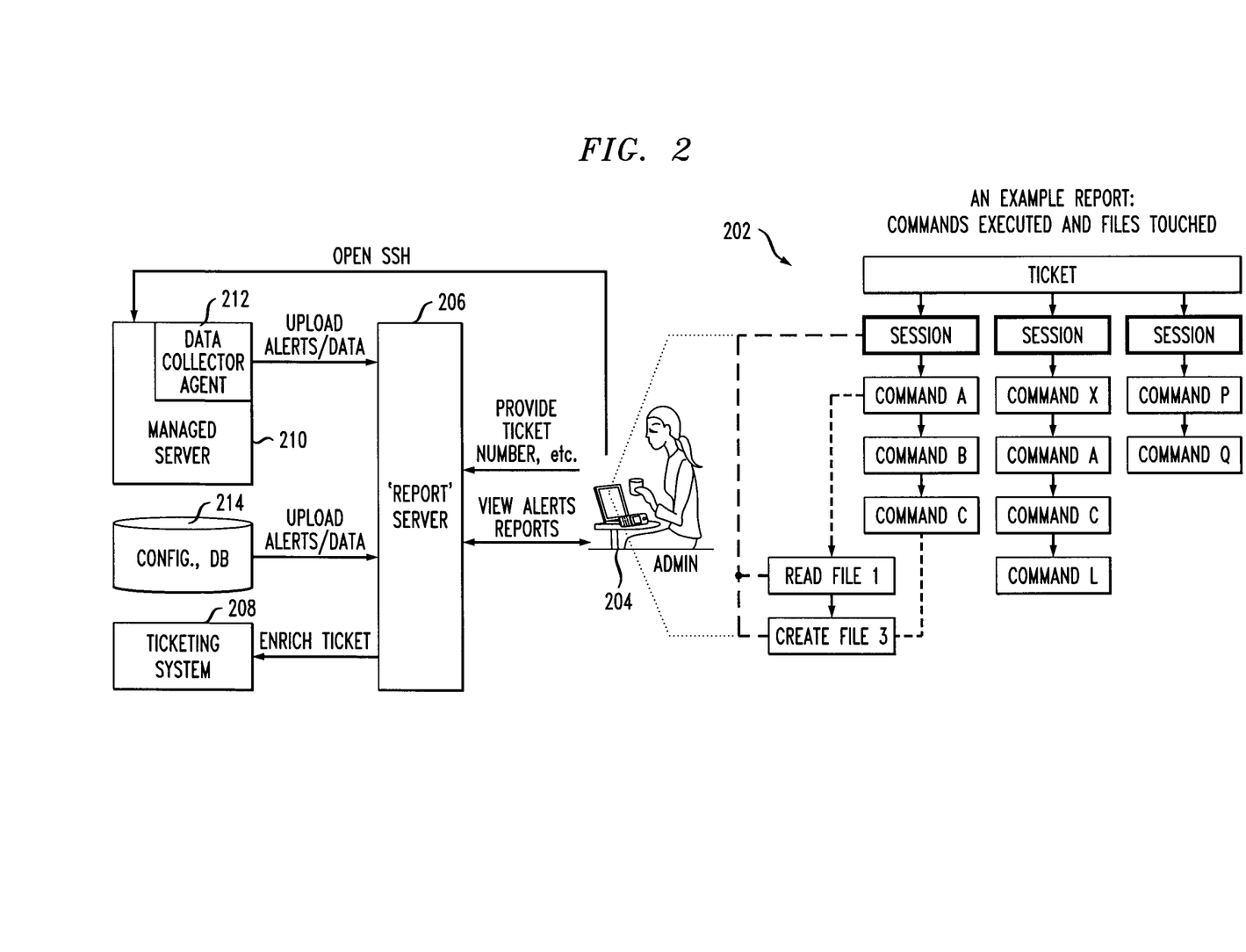
FIG. 2 is a diagram illustrating components used for automatically documenting activity data in connection with execution of a ticket, according to an embodiment of the invention.

FIG. 2 is a diagram illustrating components used for automatically documenting activity data in connection with execution of a ticket (for example, a change ticket), according to an embodiment of the invention. By way of illustration, FIG. 2 depicts an example report 202, an administrator (admin) 204, a report server module 206, a ticketing system module 208, a configuration database 214, and a managed server module 210 that includes a data collector agent module 212.

As illustrated in FIG. 2, the admin 204 can open a secure shell (ssh) with the managed server module 210 to execute a change ticket, and provide the report server module 206 with change ticket number, etc. before any further execution. The report server module 206 can also interact with the ticketing system module 208 to provide enriched tickets. The managed server module 210 notifies the data collector agent module 212 to start monitoring the ssh. The data collector agent module 212 records all actions, commands, and all the files created, accessed, modified or deleted pertaining to the ssh, and also monitors all of the currently running processes for abrupt behavior.

Alerts can be uploaded corresponding to behavior changes during or after the ssh session is over. As such, the data collector agent module 212 uploads change/configuration/behavior data to the report server module 206, which can pull configuration data from the configuration database 214. The admin 204 can view details of the resources touched as a result of the execution of the commands. Additionally, the command and file-change summary is added to the ticket.

As detailed herein, one or more embodiments of the invention can include making root-cause determinations, capturing tasks/commands execution for future use in similar tickets, as well as cross-middleware/application capability (that is, the techniques described herein do not depend on any middleware running on top of the os). One or more embodiments of the invention also include automatic documentation of ticket execution, ensuring automatic and systematic documentation of all actions in the proper chronological order, as well as providing all the files touched on the managed system.

As such, a more efficient way of identifying similar tickets can be enabled. One or more embodiments of the invention use the commands implemented and files created, accessed, written, or modified to know to what extent any two tickets are similar.

Additionally, the techniques detailed herein can include suggesting the next set of executable commands during ticket execution. A first level of ticket similarity can be achieved based on the text on the current ticket being executed. As the admin progresses in completing a ticket, one or more embodiments of the invention collect the commands executed by the user and use them for searching for similar tickets, which help in presenting the (possible) command-option(s) to the admin to implement next.

Further, one or more embodiments of the invention can include ticket-to-command and ticket-to-files dependency to aid in problem localization and isolation. The dependency information helps in finding the root cause of the errors that occur after a change ticket is executed. Also, ticket similarity can be used to uncover the problem.

One or more embodiments of the invention can also include context monitoring during and after a ticket is being executed. When action(s) are being executed on an endpoint to serve a particular ticket, behavior of the endpoint may be affected (for example, a process may get terminated, resource utilization may suddenly rise, etc.). One or more embodiments of the invention can start monitoring the context, including the behavior of the processes currently running on the concerned end-point, before the actual actions pertaining to a ticket have begun executing. Such monitoring can continue, for example, after work for executing the ticket is over.

As described herein, the behavior to be captured is pluggable. This can include, by way of example, a plug-in to record abrupt terminations of processes, as well as a plug-in to record a configuration snap-shot of the system prior to beginning ticket execution. The recorded behavior can also be appended as part of the ticket so that it can be used for alerting. For example, one or more embodiments of the invention can include comparing the configuration snap-shot prior to beginning ticket execution with the snap-shot taken during or after the ticket execution and will generate alerts and/or warnings about potential problems.

Additionally, during any execution of a change/problem ticket, if some process is terminated or re-started or stopped, one or more embodiments of the invention can record this and use the information to search for similarly-natured tickets in the future. The techniques detailed herein can also include warning for a similar future change such as, for example, process x and/or service y may get stopped/re-started or terminated, lightweight directory access protocol (LDAP) or weblogic service may become unavailable, etc. As such, the techniques described herein reduce unplanned outages.

Also, one or more embodiments of the invention can include utilizing several software utilities on operating systems to monitor the commands executed, processes forked off by another process, file system changes, behavior of the processes in terms of resource usage, etc. The techniques detailed herein also include attaching to a process and/or configuration snapshot. On receiving a prompt from a server (such as, for example, depicted in FIG. 2), an agent looks for any new session from the system admin user-identifiers (-IDs), which can attach to any of the SSH sessions and such sessions can begin to be traced. In one or more embodiments of the invention, a filter can also be applied to eliminate unnecessary information and summarize the trace in terms of the commands executed and files touched.

Further, as the agent is prompted to start monitoring the endpoint, the agent also can attach to the currently-executing processes and look for their termination, etc. The agent can use capabilities that allow attaching to processes and recording what actions they are performing such as executing system commands. Also, capabilities such as strace or ptrace or upcoming capabilities in the linux filesystem such as inotify can be used to get notifications of filesystem changes. Any new process that is executed while the change/problem ticket is still open can also be attached as well. To know if a new process (not one forked off from an existing one) has started, process status (ps) command can be executed at regular intervals of time to know which processes are currently running and if there is one or more which are present now but were not present earlier. Notifications of changes in filesystems can also be used to trigger the execution of the ps command. Additionally, an agent can also execute commands to create a configuration snap-shot of the system (for example, which process is using which port, etc.).

In one or more embodiments of the invention, alerts are generated whenever system behavior is deemed to be abnormally altered or any actions deviated from the expected next action. Such instances can include, for example, when any process is terminated, if a file is touched during the execution of the change ticket that is also being used by any of the existing processes then a warning is raised, if two or more processes begin to share the same port, a possible security breach, etc.

As also described herein, in one or more embodiments of the invention, a server can receive the change, configuration, and other data before, during, and after the ticket execution. An agent running on the managed end-points can also send the above data. Further, the server can obtain the above configuration snap-shot of the system by connecting to a configuration store. Additionally, the server can generate reports for the system admin including, for example, a report such as depicted in FIG. 2. A server can also enrich the ticket being worked upon with the data obtained from the end-point and/or the configuration store. By way of example, a ticket can be updated with the all ssh session information corresponding to the ticket including the sequence of commands executed and the files touched in the process. In one or more embodiments of the invention, the server can also provide a user interface to display alerts being generated from the end-points or from the server itself.

Figure 3:
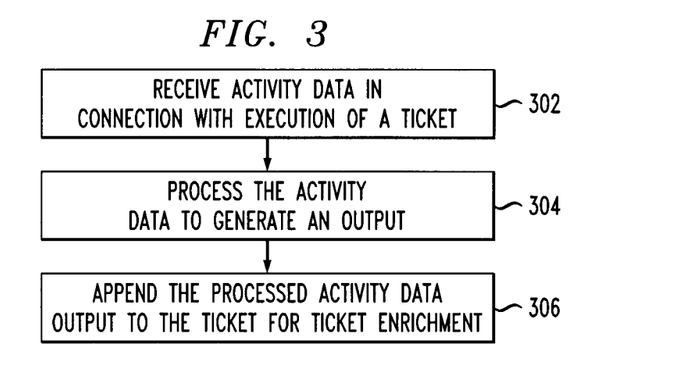
FIG. 3 is a flow diagram illustrating techniques for automatically documenting activity data in connection with execution of a ticket, according to an embodiment of the invention.

FIG. 3 is a flow diagram illustrating techniques for automatically documenting activity data in connection with execution of a ticket (for example, a change ticket and/or problem ticket), according to an embodiment of the present invention. Step 302 includes receiving activity data (for example, change data, configuration data, system behavior data, etc.) in connection with execution of a ticket. This step may be carried out, for example, by a data collector agent module (which may reside on the managed endpoint). Receiving activity data in can include, for example, receiving activity data through an agent residing at a managed endpoint. Receiving activity data can also include pulling configuration data from a configuration server. Activity data can be received before, during, and/or after the execution of the ticket. Additionally, receiving activity data can include receiving activity data after explicit monitor request sent by an administrator.

Step 304 includes processing the activity data to generate an output. This step may be carried out, for example, by a report server module (which may obtain configuration data from a configuration database). The output can include, for example, reports, alerts and/or alarms. Generating an output can include generating an alert when system behavior is deemed to be abnormally altered and/or an action deviated from an expected next action. Step 306 includes appending the processed activity data output to the ticket for ticket enrichment. This step may be carried out, for example, by a report server module.

The techniques depicted in FIG. 3 can also include comparing activity data (for example, configuration and/or behavior) snapshots at two different points in time and taking automated actions based on the snapshots. Additionally, one or more embodiments of the invention can include suggesting solution steps by comparing the ticket with successfully solved similar tickets, as well as automatically identifying resolution codes apt for the ticket by recorded actions and commands used while solving the ticket to map to the resolution codes.

Further, the techniques depicted in FIG. 3 can include using clustering approaches (for example, wherein if the "information distance" is greater than a given threshold) to warn a system administrator that a choice of ticket code is potentially wrong and/or suggest a closest code to set. One or more embodiments of the invention can additionally include context monitoring during and after a ticket is being executed, raising at least one of an alert and an alarm if an abnormality is observed in the context, as well as applying a filter to eliminate unnecessary information and summarize a trace in terms of each command executed and file touched. Further, the techniques detailed herein can also include providing a user interface to display an alert, a report and/or an alarm (for example, an alert generated from the end-points or from the server itself).

The techniques depicted in FIG. 3 can also, as described herein, include providing a system, wherein the system includes distinct software modules, each of the distinct software modules being embodied on a tangible computer-readable recordable storage medium. The distinct software modules can include, for example, a report server module, a ticketing system module, a configuration database module, a managed server module, a data collector agent module and an analysis engine module executing on a hardware processor.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

Figure 4:
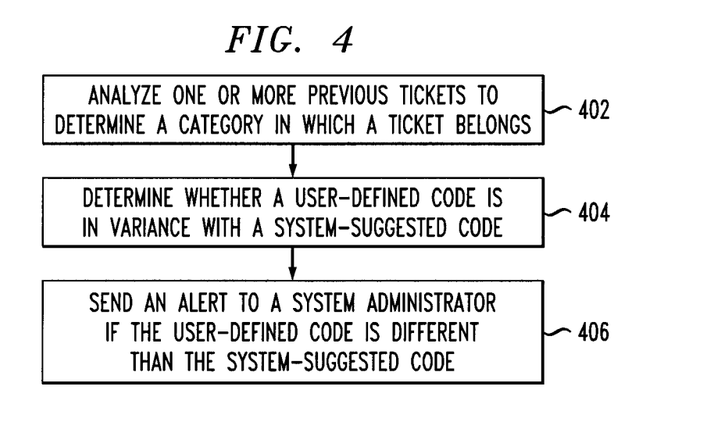
FIG. 4 is a flow diagram illustrating techniques for identifying a wrong choice of resolution code in connection with a ticket, according to an embodiment of the invention.

FIG. 4 is a flow diagram illustrating techniques for identifying a wrong choice of resolution code in connection with a ticket, according to an embodiment of the invention. Step 402 includes analyzing one or more previous tickets to determine a category in which a ticket belongs. Step 404 includes determining whether a user-defined code is in variance with a system-suggested code. Step 406 includes sending an alert to a system administrator if the user-defined code is different than the system-suggested code.

The techniques depicted in FIG. 4 can also, as described herein, include providing a system, wherein the system includes distinct software modules, each of the distinct software modules being embodied on a tangible computer-readable recordable storage medium.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
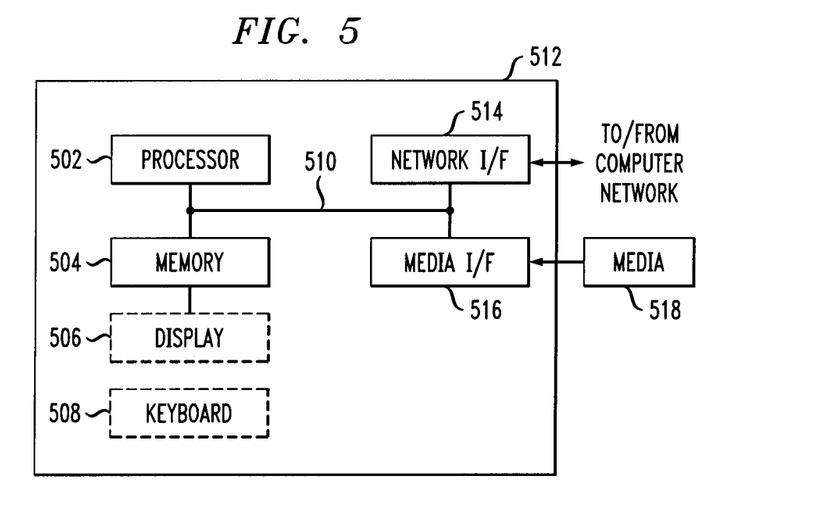
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like)

can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, pulling configuration data explicitly from a configuration server that is used for storing configuration data for all clients in order to combine it with obtained change data.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for automatically documenting activity data in connection with execution of a ticket, wherein the method comprises:
   receiving activity data in connection with execution of a ticket;
   automatically processing the activity data to generate an output, wherein the output includes documentation of all commands implemented in the execution of the ticket and the chronological sequences of the commands;
   determining whether a user-defined resolution code for the ticket is in variance with a system-suggested code based on a comparison of the activity data for the ticket and activity data for one or more previously-executed tickets in a related resolution code category;
   automatically identifying a resolution code for the ticket based on the activity data for the ticket if the user-defined code is in variance with the system-suggested code; and
   appending the identified resolution code and the processed documentation of all commands implemented in the execution of the ticket and the chronological sequences of the commands to the ticket for ticket enrichment for future use.

2. The method of claim 1, wherein receiving activity data comprises receiving activity data after explicit monitor request sent by an administrator.

3. The method of claim 1, wherein the output comprises at least one of one or more reports and one or more alerts.

4. The method of claim 1, wherein activity data comprises at least one of change data, configuration data, and system behavior data.

5. The method of claim 1, wherein receiving activity data in connection with execution of a ticket comprises receiving activity data in connection with execution of a ticket through an agent residing at a managed end-point.

6. The method of claim 1, wherein receiving activity data in connection with execution of a ticket comprises pulling configuration data from a configuration server.

7. The method of claim 1, wherein receiving activity data in connection with execution of a ticket comprises receiving activity data in connection with execution of a ticket at least one of before, during, and after the execution of the ticket.

8. The method of claim 1, wherein generating an output comprises generating an alert when at least one of system behavior is deemed to he abnormally altered and an action deviated from an expected next action.

9. The method of claim 1, further comprising:
   context monitoring during and after a ticket being executed; and
   raising at least one of an alert and an alarm if an abnormality is observed in the context.

10. The method of claim 1, further comprising suggesting solution steps by comparing the ticket with one or more successfully solved similar tickets.

11. The method of claim 1, further comprising automatically identifying one or more resolution codes apt for the ticket by analyzing one or more recorded actions and commands used while solving the ticket to map to the one or more resolution codes.

12. The method of claim 1, further comprising using clustering approaches to at least one of warn a system administrator that a choice of ticket code is potentially wrong and suggest a closest code to set.

13. The method of claim 1, further comprising applying a filter to eliminate unnecessary information and summarize a trace in terms of each command executed and file touched.

14. The method of claim 1, further comprising providing a user interface to display at least one of an alert, a report and an alarm.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise a report server module, a ticketing system module, a configuration database module, a managed server module, a data collector agent module and an analysis engine module executing on a hardware processor.

16. A method for identifying a wrong choice of resolution code in connection with a ticket, comprising the steps of:
analyzing one or more previously-executed tickets to determine a category in which a first executed ticket belongs based on information appended to the ticket and information appended to the one or more previous tickets, wherein the information comprises documentation of all commands implemented in execution of each ticket and the chronological sequences of the commands;
determining whether a user-defined code is in variance with a system-suggested code based on comparison of the information appended to the first executed ticket and information appended to one or more previously-executed tickets in the determined category;
sending an alert to a system administrator if the user-defined code is different than the system-suggested code; and
sending the system-suggested code to replace the user-defined code if the user-defined code is different than the system-suggested code.

17. A computer program product comprising a tangible computer readable recordable storage medium including computer useable program code for automatically documenting activity data in connection with execution of a ticket, the computer program product including:
computer useable program code for receiving activity data in connection with execution of a ticket;
computer useable program code for automatically processing the activity data to generate an output, wherein the output includes documentation of all commands implemented in the execution of the ticket and the chronological sequences of the commands;
computer useable program code for determining whether a user-defined resolution code for the ticket is in variance with a system-suggested code based on a comparison of the activity data for the ticket and activity data for one or more previously-executed tickets in a related resolution code category;
computer useable program code for automatically identifying a resolution code for the ticket based on the activity data for the ticket if the user-defined code is in variance with the system-suggested code; and
computer useable program code for appending the identified resolution code and the processed documentation of all commands implemented in the execution of the ticket and the chronological sequences of the commands to the ticket for ticket enrichment for future use.

18. The computer program product of claim 17, further comprising:
computer useable program code for context monitoring during and after a ticket being executed; and
computer useable program code for raising at least one of an alert and an alarm if an abnormality is observed in the context.

19. A system for automatically documenting activity data in connection with execution of a ticket, comprising:
a memory; and
at least one processor coupled to the memory and operative to:
receive activity data in connection with execution of a ticket;
automatically process the activity data to generate an output, wherein the output includes documentation of all commands implemented in the execution of the ticket and the chronological sequences of the commands;
determine whether a user-defined resolution code for the ticket is in variance with a system-suggested code based on a comparison of the activity data for the ticket and activity data for one or more previously-executed tickets in a related resolution code category;
automatically identify a resolution code for the ticket based on the activity data for the ticket if the user-defined code is in variance with the system-suggested code; and
append the identified resolution code and the processed documentation of all commands implemented in the execution of the ticket and the chronological sequences of the commands to the ticket for ticket enrichment for future use.

20. The system of claim 19, wherein the at least one processor coupled to the memory is further operative to:
perform context monitoring during and after a ticket being executed; and
raise at least one of an alert and an alarm if an abnormality is observed in the context.

* * * * *